2 Sheets--Sheet 1.

WILLIAM R. MIDDLETON.

Improvement in Machines for Separating Middlings.

No. 4,827. Reissued March 26, 1872.

*Witnesses:*
T. C. Brecht
Richard Henry Taylor

*Inventor:*
Wm. R. Middleton
By Daniel Breed
Atty

2 Sheets--Sheet 2.

WILLIAM R. MIDDLETON.

Improvement in Machines for Separating Middlings.

No. 4,827. Reissued March 26, 1872.

Witnesses:
J. C. Brecht
Richard Henry Taylor

Inventor.
Wm R. Middleton
By Daniel Breed
Atty

UNITED STATES PATENT OFFICE.

WILLIAM R. MIDDLETON, OF CLEVELAND, OHIO.

IMPROVEMENT IN MACHINES FOR SEPARATING MIDDLINGS.

Specification forming part of Letters Patent No. 108,926, dated November 1, 1870; reissue No. 4,827, dated March 26, 1872.

SPECIFICATION.

*To all whom it may concern:*

Be it known that I, WILLIAM R. MIDDLETON, of Cleveland, in the county of Cuyahoga and State of Ohio, have invented certain new and useful Improvements in Machines for Separating Middlings, of which the following is a full description, reference being had to the accompanying drawing making part of this specification.

Figure 1:
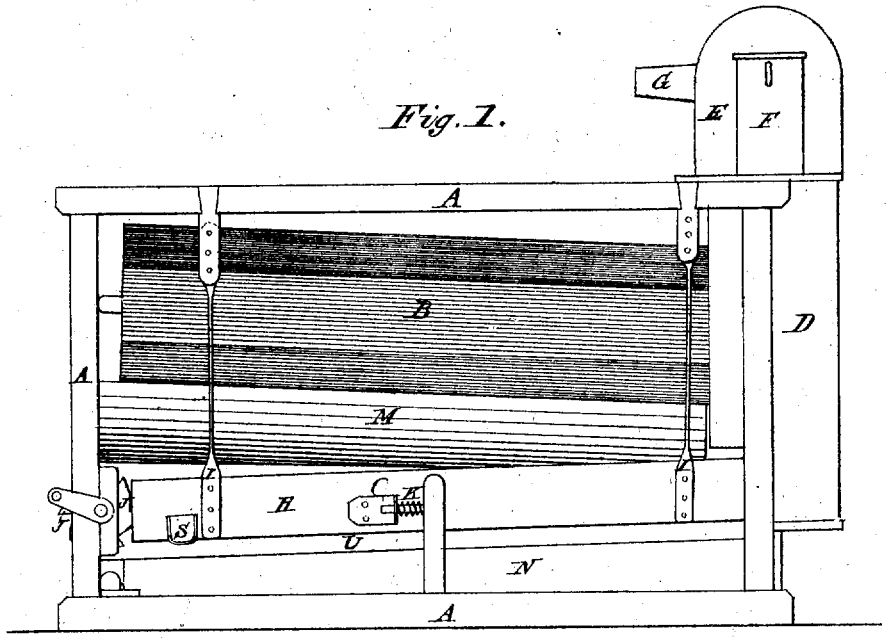
Figure 2:
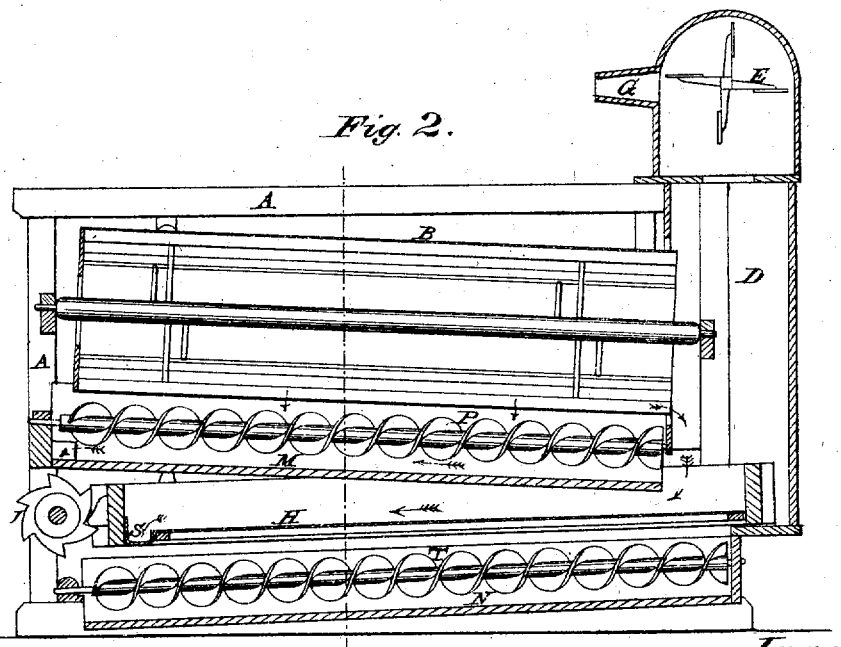
Figure 3:
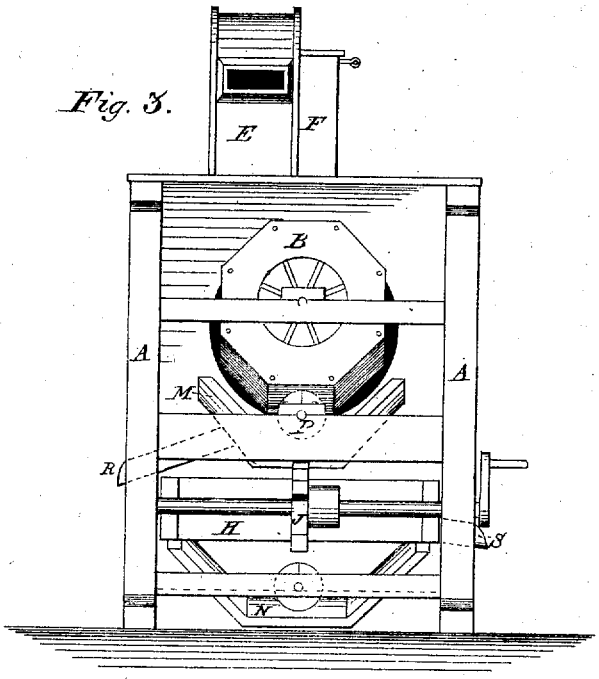
Figure 4:
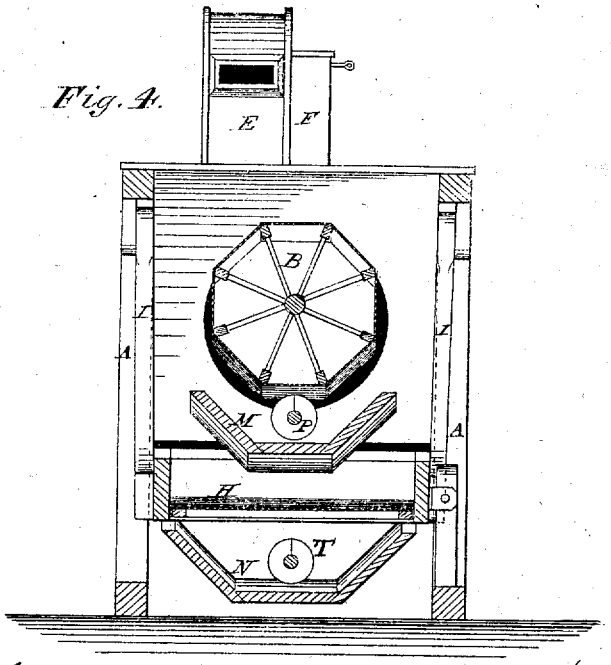

In the accompanying drawing, Figure 1 is a side elevation of my middlings-separator, the side of the bolt-chest usually inclosing the reel being removed to show the working devices. Fig. 2 is a vertical and longitudinal section of my machine. Fig. 3 is an end view of the same. Fig. 4 is a vertical and transverse section of the machine.

My invention consists, first, of a sieve, in combination with suspending-springs, lateral guides provided with spiral or other springs, and a cam-wheel to jar or operate the sieve; second, in the combination of the sieve, suspended and operated as above described, with a bolting-reel; and, third, in the combination of the sieve, suspended and operated as above described, with the reel and a fan or blower.

In the construction of my improved separator for middlings, the frame A, Fig. 1, and the chest for inclosing the reel and sieve may be of any suitable form, as is well known. The bolting-reel B is hung and rotated in the usual way, the meal being fed into the upper end. The finer grade of flour falls into the trough M, and is discharged through the spout R, Fig. 3, by means of the conveyer P, Fig. 2. The coarser meal and bran fall from the lower end of the bolting-reel B upon the broad flat sieve or bolt H, as indicated by arrows in Fig. 2. A suction-fan, E, is placed above the chamber D, and operated to carry off the dust and lighter bran through passage F and spout G. In this manner the falling meal is subjected to a suction-blast, and thus the finer and lighter particles of dust and bran are separated and carried out of the machine. The flat sieve H, Figs. 2 and 4, has a large area, so as to spread the middlings very thin while being sifted. This sieve is placed nearly horizontal, and is suspended so as to freely vibrate longitudinally with a peculiar jarring motion, as will now be explained. The sieve H is suspended by four long slender springs, I, which allow the sieve to move lengthwise without friction, and almost as freely as if swung on ropes. On each side of the sieve is a guide, O, which slides freely on the pin or rod U, and is pressed backward by the coiled spring K. Thus suspended, the sieve is set in motion by the revolution of the cam-wheel J, which has a series of cams and notches. At every notch in the revolving wheel J the coiled springs K push the sieve back suddenly with a sharp stroke upon the cam-wheel. This jarring stroke is similar to that of a hammer against the sieve, and the action is very efficient in sifting the middlings. The stroke clears the meshes of the cloth, which may consequently be very fine. The coarser particles rise to the top of the layer of meal in the sieve, and constantly travel toward the bran-spout S, Fig. 2, to be discharged. The middlings, falling through the sieve H, are received in the trough N, from which it is removed by the conveyer T.

It should be observed that the above-described motion of the sieve is not entirely automatic and limited to the precise motion of the cam-wheel, but in part dependent upon the stroke of the sieve upon the cam-wheel, which is not in itself mechanical, though produced by the machine. I regard this jarring stroke of the bolt as practically more efficient than the reciprocating crank-motion in common use.

Having described my invention, I claim—

1. The swinging bolt or sieve H, in combination with the suspending-springs I, the lateral guides O, the springs K, and cam-wheel J, substantially in the manner and for the purposes set forth.

2. In combination with the sieve suspended and operated as above described, I claim the reel B, substantially as set forth.

3. In combination with the sieve suspended and operated as above described, I claim the reel B and fan or blower E, substantially as set forth.

WILLIAM R. MIDDLETON.

Witnesses:

WILLIAM H. HARVEY,

THOS. E. GILL.